B. G. KRAMER.
BRAKE MECHANISM.
APPLICATION FILED NOV. 18, 1916.
1,344,003.
Patented June 22, 1920.
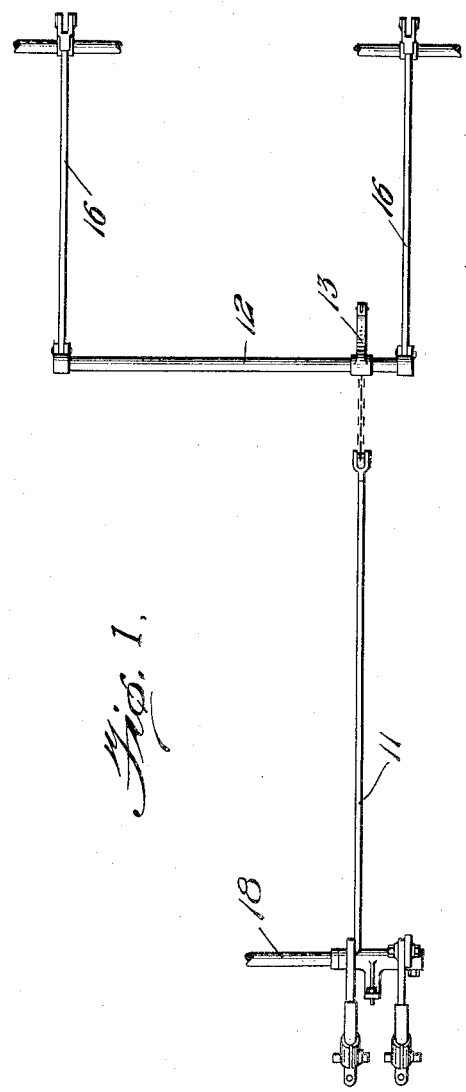
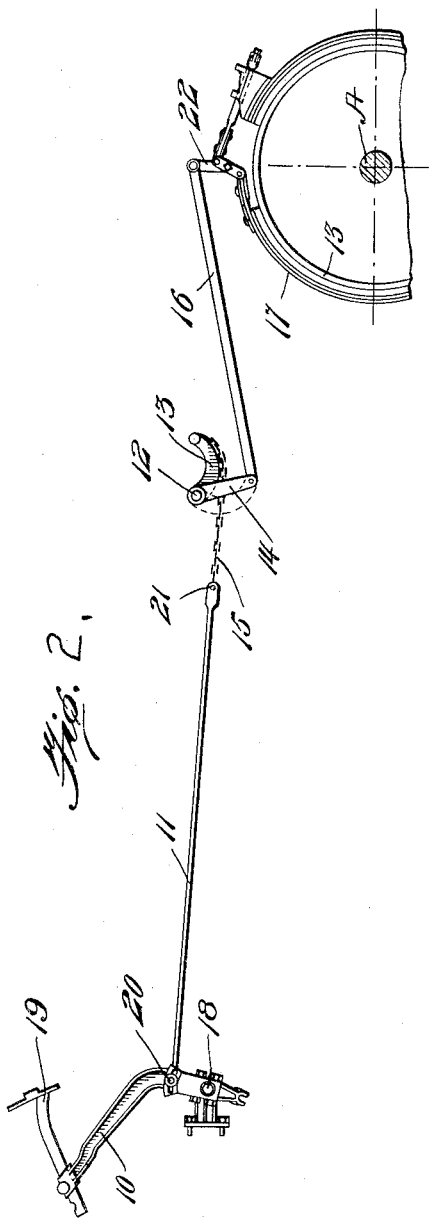

UNITED STATES PATENT OFFICE.

BENJAMIN G. KRAMER, OF INDIANAPOLIS, INDIANA, ASSIGNOR TO CARL G. FISHER AND JAMES A. ALLISON, BOTH OF INDIANAPOLIS, INDIANA.

BRAKE MECHANISM.

1,344,003. Specification of Letters Patent. Patented June 22, 1920.

Application filed November 18, 1916. Serial No. 132,153.

*To all whom it may concern:*

Be it known that I, BENJAMIN G. KRAMER, a citizen of the United States, residing at Indianapolis, Marion county, and State of Indiana, have invented and discovered certain new and useful Improvements in Brake Mechanism, of which the following is a specification.

The object of my said invention is to provide an improved construction and arrangement of parts of brake mechanism, particularly designed for automobiles, whereby the exertion required for applying the brakes need not materially, or perhaps not at all, be increased as the operating pedal, or lever, is moved forward to set said brakes, and much of the strain and exertion usually required in such operation may be avoided, all as will be hereinafter more fully described and claimed.

Referring to the accompanying drawings, which are made a part hereof and on which similar reference characters indicate similar parts, Figure 1 is a top or plan view of a brake operating mechanism constructed in accordance with my said invention, and Fig. 2 a side elevation of the same.

In said drawings, the portions marked 10 represent the operating lever, 11 the brake rod, 12 a rock-shaft, 13 a curved crank-arm on said rock-shaft, 14 a crank-arm on each end of said rock-shaft extending at an angle with the arm 13, 15 a flexible connection between brake rod 11 and arm 13, 16 rods extending from the arms 14 to the brake operating arms 22, and 17 the brake.

The operating lever 10 is pivoted on a rock-shaft 18 and provided with a foot pedal 19, of the usual type. The brake rod 11 is connected thereto at a point 20, in the usual or any approved manner. The crank-arm 13 is secured fast on the rock-shaft 12 and is formed curved, substantially in a segment of a circle, as best shown in Fig. 2, and curves downwardly from its connection with the shaft 12, its outer end being curved upward. To its outer end is connected one end of the flexible connection 15, the opposite end being connected at point 21 with the brake rod 11. The arms 14 extend downwardly at an angle somewhat less than 90° from the general direction of the arm 13, and their lower ends are connected by the rods 16 with the upper ends of arms 22, which, in turn, are connected to operate the brakes 17, around the brake drums 23, on axle A, in the usual manner. The flexible connection passes over and bears upon the curved lower face of arm 13, the curvature of which is such as may be desired to secure the leverage required.

In operation, when the lever 10 is forced forward by the foot pedal 19, in the usual manner, the movement meets with little resistance and the start is therefore easy; but as the brake begins to impinge upon the surface of the brake ring, increased power is required, but as the arm 13 moves downward, the leverage increases, and the increased leverage is sufficient to take care of the increased resistance, so that the brake may be applied with but comparatively little more exertion, if any, than required at the start. In the usual operation of the brake pedal, the movement is about 2 inches, and nearly two-thirds of the movement is taken up in the movement of the pedal and the brake rod before the brake begins to take hold. In the usual construction, the leverage is the same throughout the entire movement and an unusual exertion is therefore required during the last third of the movement to apply the brake, and as this is usually at about the limit of the leg reach of the operator, the strain and exertion are correspondingly augmented. By the use of my invention, this exertion is obviated and the last end of the movement during the application of the brake is rendered comparatively as easy as the first part of the movement, thus relieving the operator of this objectionable strain and exertion necessary in the use of the common construction of brake mechanism.

It will be understood, of course, that a straight arm might be used in lieu of the curved arm 13 and similar results obtained, but the curved form is preferable since it enables the power to be varied by varying the radius of the curve, and also enables the cam or raised portion to be so formed on the curved surface as to increase the leverage at certain desired points of the travel of the lever.

While I have shown this mechanism as operated by a foot pedal, it will be understood, of course, that it may be operated by any other means, such as electric or vacuum power, or any other power found appropriate or desirable. Also, while I have shown a well-known type of brake, it will be understood that this invention may be adapted for use with any other type desired.

Having thus fully described my said invention, what I claim as new and desire to secure by Letters Patent, is:

1. The combination with a brake, of a lever connected therewith normally approximately at the angle of minimum leverage of the lever and adapted to move toward its angle of maximum leverage, an eccentric, a flexible member secured to and passing about the arc of the eccentric, said eccentric being rigidly connected with the lever in such position that uniform stress from the flexible member exerts continually increasing force upon the lever, and means to apply power to the flexible member.

2. The combination with a brake, of a lever connected therewith normally approximately at the angle of minimum leverage of the lever and adapted to move toward its angle of maximum leverage, a curved arm, a flexible member secured to and passing about an arc of the curved arm, said curved arm being rigidly connected with the lever with its center of curvature other than its fulcrum and in such position that uniform stress from the flexible member exerts continually increasing force upon the lever, and means to apply power to the flexible member.

In witness whereof I have hereunto set my hand and seal at Indianapolis, Indiana, this 8th day of November, A. D. nineteen hundred and sixteen.

BENJAMIN G. KRAMER. [L. S.]

Witnesses:
  E. W. BRADFORD,
  A. C. RICE.